(No Model.)
K. J. SUNDSTROM.
MANUFACTURE OF SODA.
No. 492,929. Patented Mar. 7, 1893.
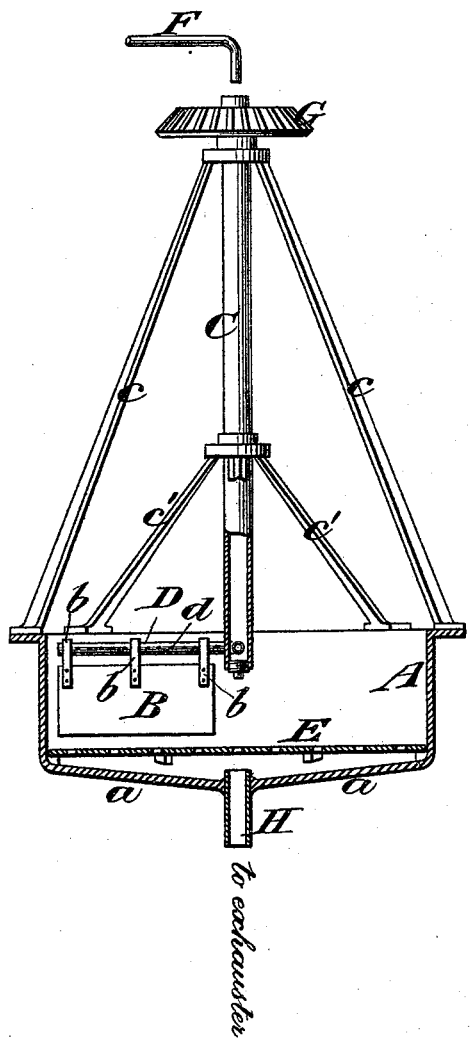
Witnesses:-
O. H. Hayford
C. L. Sundgren
Inventor:-
Karl J. Sundstrom
by attorneys
Brown Dewand

UNITED STATES PATENT OFFICE.

KARL J. SUNDSTROM, OF BROOKLYN, ASSIGNOR TO CHURCH & CO., OF NEW YORK, N. Y.

MANUFACTURE OF SODA.

SPECIFICATION forming part of Letters Patent No. 492,929, dated March 7, 1893.

Application filed July 29, 1892. Serial No. 441,601. (No specimens.)

*To all whom it may concern:*

Be it known that I, KARL J. SUNDSTROM, of Brooklyn, in the county of Kings and State of New York, have invented a new and useful Improvement in the Manufacture of Soda, of which the following is a specification.

My invention relates to an improvement in the method of purifying bicarbonate of soda in the manufacture of soda by the process generally known as the "ammonia process" the object being to provide a simple and effective method for obtaining commercially pure bicarbonate of soda. The mixture resulting from the treatment of a solution of sodium chloride and ammonia with carbonic acid, consists of bicarbonate of soda, sodium chloride and various ammonium combinations and is called "bicarbonate mud."

Heretofore it has been customary to cover the bicarbonate mud with water and allow it to remain a while before removing it, or the mud has been mechanically mixed with a body of water for some fifteen minutes or thereabout before separating the solution from the bicarbonate. Both of these methods employ a large surplus water and result in a considerable loss of time and material without producing a bicarbonate of desirable purity. I have found that bicarbonate of soda is insoluble, or nearly so, in a concentrated solution of sodium chloride or a salt brine, and if water in a very finely divided state be caused to pass through the bicarbonate mud, it will dissolve the sodium chloride, forming a concentrated solution therewith and leaving the bicarbonate of soda pure and intact.

My present invention therefore consists, in passing water in a finely divided spray through bicarbonate mud and thereby dissolving the sodium chloride and removing it from the bicarbonate of soda.

My invention further consists in first treating the bicarbonate mud with a solvent of ammonia combinations and subsequently passing water through the mud in a finely divided spray to remove the sodium chloride from the mud.

The accompanying drawing represents a form of apparatus which may be employed to carry my process into effect.

A represents the receptacle for the reception of the material to be operated upon, and it may be made of iron, wood or any other suitable material. An upright hollow shaft or tube C is mounted in suitable supports $c$, $c'$ so as to rotate freely, and has its lower end projected a short distance into the upper portion of the receptacle A. A laterally extending tubular arm D communicates at one end with the interior of the tubular shaft C and is fixed thereto so as to rotate together with the shaft. The arm D is provided with numerous small perforations $d$ through which the solvent liquid is allowed to escape in the form of fine spray within the receptacle.

A perforated false bottom E is located a short distance above the bottom proper of the receptacle A and the bottom $a$ of the receptacle A is preferably made to slant from the side downwardly toward the central portion where the exit pipe H is located. A vacuum pump, or other vacuum apparatus, of well known or approved form, (not shown herein) communicates with the pipe H and serves to draw the solvent liquid rapidly down through the material being operated upon. A scraper B is hung from the arm D to keep the surface of the material within the receptacle level.

In practice, after the bicarbonate mud has been drained from liquid adhering thereto, I sprinkle the solvent liquid (in the present instance water) in a finely divided spray, evenly over the surface of the material being operated upon, rotating the distributing arm D with greater or lesser speed, and supplying the water in greater or lesser quantity, as may be found expedient, and immediately suck the spray through the bicarbonate mud by means of the vacuum apparatus. After a few minutes the mud is freed from sodium chloride and the bicarbonate of soda requires to be only dried and treated in the usual manner in order to be ready for use.

Before applying the water in a finely divided spray to free the mud from sodium chloride, it may be treated with a concentrated salt brine or any other suitable solvent of the ammonia combinations to free the mud from the latter, and the sodium chloride may then be removed to complete the purifying.

What I claim is—

1. The process of purifying bicarbonate mud, consisting in passing water in a finely divided spray through the mud and thereby removing the sodium chloride, substantially as set forth.

2. The process of purifying bicarbonate mud, consisting in first treating the mud with a solvent of the ammonia combinations and subsequently passing water in a finely divided spray through the mud to remove the sodium chloride, substantially as set forth.

KARL J. SUNDSTROM.

Witnesses:
I. B. DECKER,
GEORGE BARRY.